US009917714B2

(12) United States Patent
Mayo

(10) Patent No.: US 9,917,714 B2
(45) Date of Patent: Mar. 13, 2018

(54) APPARATUS COMPRISING AN ANTENNA ARRAY

(71) Applicant: PHASOR SOLUTIONS LIMITED, Birmingham (GB)

(72) Inventor: Richard Hammond Mayo, Birmingham (GB)

(73) Assignee: Phasor Solutions Limited, Birmingham (GB)

( * ) Notice: Subject to any disclaimer, the term of this patent is extended or adjusted under 35 U.S.C. 154(b) by 0 days.

(21) Appl. No.: 15/121,893

(22) PCT Filed: Feb. 25, 2015

(86) PCT No.: PCT/GB2015/050532
§ 371 (c)(1),
(2) Date: Aug. 26, 2016

(87) PCT Pub. No.: WO2015/128632
PCT Pub. Date: Sep. 3, 2015

(65) Prior Publication Data
US 2017/0063585 A1    Mar. 2, 2017

(30) Foreign Application Priority Data
Feb. 27, 2014    (GB) .................................. 1403507.5

(51) Int. Cl.
*H04K 1/10* (2006.01)
*H04L 27/28* (2006.01)
(Continued)

(52) U.S. Cl.
CPC ........... *H04L 27/2273* (2013.01); *H01Q 3/26* (2013.01); *H04B 7/08* (2013.01); *H04B 7/0885* (2013.01); *H04B 17/27* (2015.01); *H04L 1/206* (2013.01)

(58) Field of Classification Search
CPC ..... H04L 27/2273; H04L 1/206; H04B 17/27; H04B 7/0885; H04B 1/40; H01Q 3/26; H01Q 1/3216; H04D 3/004
(Continued)

(56) References Cited

U.S. PATENT DOCUMENTS 3,384,895 A    5/1968    Webb
3,725,938 A    4/1973    Black et al.
(Continued)

FOREIGN PATENT DOCUMENTS

CN    101039135 A    9/2007
EP    0987560 A1    3/2000
(Continued)

OTHER PUBLICATIONS

International Search Report and Written Opinion for PCT/GB2015/050532, dated Jul. 2, 2015; 9 pages.
(Continued)

*Primary Examiner* — Phuong Phu
(74) *Attorney, Agent, or Firm* — Reza Mollaaghababa; Thomas J. Engellenner; Pepper Hamilton LLP

(57) ABSTRACT

Apparatus (100) is described comprising: an antenna array (102₁ . . . 102_N); a plurality of units (104₁ . . . 104_N), each unit configured to mix a radio frequency signal from one or more of the antennas (102) with oscillating signals having phases defined by a global signal and to provide in-phase and quadrature-phase signals; a constellation rotation system configured to, for each unit, rotate a constellation point associated with the in-phase and quadrature-phase signals by a rotation angle to provide adjusted in-phase and quadrature-phase signals; signal buses (106, 107) for global in-phase and quadrature-phase signals configured to receive the adjusted in-phase and quadrature-phase signals, respectively, from a plurality of the units; a feedback system
(Continued)

configured to, for each unit, compare one or more of the adjusted in-phase and quadrature-phase signals with one or more of the global in-phase and quadrature-phase signals to determine an error in the rotation angle.

17 Claims, 6 Drawing Sheets

(51) Int. Cl.
| | |
|---|---|
| H04L 27/227 | (2006.01) |
| H01Q 3/26 | (2006.01) |
| H04B 7/08 | (2006.01) |
| H04B 17/27 | (2015.01) |
| H04L 1/20 | (2006.01) |

(58) Field of Classification Search
USPC .............. 375/260, 219, 220, 222; 342/157; 370/314
See application file for complete search history.

(56) References Cited

U.S. PATENT DOCUMENTS

| | | | |
|---|---|---|---|
| 3,787,775 | A | 1/1974 | Lanning |
| 3,967,279 | A | 6/1976 | Zeger |
| 4,044,396 | A | 8/1977 | Haws et al. |
| 4,117,487 | A | 9/1978 | Minohara et al. |
| 4,132,995 | A | 1/1979 | Monser |
| 4,148,031 | A | 4/1979 | Tausworthe et al. |
| 4,162,499 | A | 7/1979 | Jones, Jr. et al. |
| 4,287,518 | A | 9/1981 | Ellis, Jr. |
| 4,387,597 | A | 6/1983 | Brandestini |
| 4,394,660 | A | 7/1983 | Cohen |
| 4,431,998 | A | 5/1984 | Finken |
| 4,675,685 | A | 6/1987 | Finken |
| 4,682,181 | A | 7/1987 | Dumas et al. |
| 4,816,775 | A | 3/1989 | Ryan |
| 4,998,181 | A | 3/1991 | Haws et al. |
| 5,126,751 | A | 6/1992 | Wada et al. |
| 5,128,689 | A | 7/1992 | Wong et al. |
| 5,184,141 | A | 2/1993 | Connolly et al. |
| 5,216,435 | A | 6/1993 | Hirata et al. |
| 5,276,455 | A | 1/1994 | Fitzsimmons et al. |
| 5,493,305 | A | 2/1996 | Wooldridge et al. |
| 5,504,453 | A | 4/1996 | MacDonald et al. |
| 5,585,803 | A * | 12/1996 | Miura .................. H01Q 3/26 342/157 |
| 5,702,073 | A | 12/1997 | Fluegel |
| 5,857,004 | A * | 1/1999 | Abe .................. H03D 3/004 348/731 |
| 5,886,671 | A | 3/1999 | Riemer et al. |
| 5,894,494 | A | 4/1999 | Davidovici |
| 6,198,445 | B1 | 3/2001 | Alt et al. |
| 6,297,775 | B1 | 10/2001 | Haws |
| 6,305,463 | B1 | 10/2001 | Salmonson |
| 6,414,644 | B1 | 7/2002 | Desargant et al. |
| 6,553,083 | B1 | 4/2003 | Kawai |
| 6,693,590 | B1 | 2/2004 | Toplicar et al. |
| 6,714,163 | B2 | 3/2004 | Navarro et al. |
| 6,903,931 | B2 | 6/2005 | McCordic et al. |
| 6,961,028 | B2 | 11/2005 | Joy et al. |
| 7,092,690 | B2 | 8/2006 | Zancewicz |
| 7,132,990 | B2 | 11/2006 | Stenger et al. |
| 7,253,777 | B2 | 8/2007 | Blaschke et al. |
| 7,325,772 | B1 | 2/2008 | Hanewinkel, III et al. |
| 7,372,414 | B2 | 5/2008 | Soiron et al. |
| 7,508,338 | B2 | 3/2009 | Pluymers et al. |
| 7,786,937 | B1 | 8/2010 | Stierhoff et al. |
| 7,889,135 | B2 | 2/2011 | Blaser et al. |
| 7,898,810 | B2 | 3/2011 | Mason et al. |
| 7,957,457 | B2 * | 6/2011 | Rofougaran .............. H04B 1/40 370/314 |
| 7,990,298 | B1 | 8/2011 | Friedmann et al. |
| 8,279,131 | B2 | 10/2012 | Puzella et al. |
| 8,654,017 | B1 | 2/2014 | Voss et al. |
| 9,300,040 | B2 * | 3/2016 | Mayo .................. H01Q 1/3216 |
| 2002/0135513 | A1 | 9/2002 | Paschen et al. |
| 2003/0091105 | A1 | 5/2003 | Schilling |
| 2005/0249321 | A1 | 11/2005 | Dawson et al. |
| 2006/0046648 | A1 | 3/2006 | DiFonzo et al. |
| 2008/0004078 | A1 | 1/2008 | Barratt et al. |
| 2008/0114224 | A1 | 5/2008 | Bandy et al. |
| 2008/0161660 | A1 | 7/2008 | Arneson et al. |
| 2008/0212662 | A1 | 9/2008 | Lee et al. |
| 2011/0146957 | A1 | 6/2011 | Buchholz et al. |
| 2011/0291889 | A1 | 12/2011 | Mayo |
| 2012/0038525 | A1 | 2/2012 | Monslave Carcelen et al. |
| 2014/0139400 | A1 | 5/2014 | Voss et al. |

FOREIGN PATENT DOCUMENTS

| | | |
|---|---|---|
| EP | 1538698 A1 | 6/2005 |
| EP | 1703662 A1 | 9/2006 |
| EP | 1798809 A1 | 6/2007 |
| EP | 1819064 A2 | 8/2007 |
| GB | 2314981 A | 1/1998 |
| JP | S6415866 A | 1/1989 |
| JP | H03234128 A | 10/1991 |
| JP | 2000031874 A | 1/2000 |
| WO | 200177706 A1 | 10/2001 |
| WO | 2007080141 A1 | 7/2007 |
| WO | 2010/007442 A1 | 1/2010 |
| WO | 2010007637 A1 | 1/2010 |
| WO | 2010029125 A1 | 3/2010 |
| WO | 2011007164 A2 | 1/2011 |
| WO | 2014/030016 A2 | 2/2014 |

OTHER PUBLICATIONS

Search Report for GB 1403507.5, dated Sep. 3, 2014; 2 pages.
Adler et al., "Two-Way Airborne Broadband Communications Using Phased Array Antennas", 2003 IEEE, vol. 2-925, pp. 1-8.
Aung., "Cooling Technology for Electronic Equipment", Hemisphere Publishing Corporation, 1988.
Barrett et al., "Adaptive Anennas for Mobile Communications", Electronics and Communication Engineering Journal, Institution of Electgrical Engineers, London, GB, vol. 6, No. 4, Aug. 1, 1994, pp. 203-214, XP00469556 ISSN: 0954-0695, pp. 206-207 figure 4.
Driver et al., "Wafer Scale Integration", 1989 IEEE, pp. 1-10.
Erickson et al., "Integrated Circuit Active Phased Array Antennas for Millimeter Wave Communications Applications", 1994 IEEE, pp. 848-851.
Examination Report received in Australian Application No. 2009272440 dated Dec. 19, 2012; 3 pages.
Examination Report received in GB Application No. 0813237.5 dated Jul. 8, 2010; 2 pages
Greda et al., "Tx-Terminal Phased Array for Satellite Communication at Ka-band", ATENNA project under contract No. 502843, pp. 266-269.
Greda et al., "An Active Phased Array for Mobile Satellite Communication at Ka-Band in LTCC Technology", Antennas and Propagation Society International Symposium, 2009. APSURSI '09. IEEE, Jun. 2009, pp. 1-4.
Gregorwich., "Conformal Airborne Arrays", 1997 IEEE, pp. 463-470.
International Preliminary Report on Patentability received in PCT/GB2009/050880 dated Jan. 18, 2011; 6 pages.
International Search Report received in PCT/GB2009/050880 dated Oct. 23, 2009; 5 pages.
International Search Report received in PCT/GB2013/052235 dated May 26, 2014; 4 pages.
Jones et al., "Connexion by Boeing—Broadband Satellite Communication System for Mobile Platforms", 2001 IEEE, pp. 755-758.
Kayton., "One Hundred Years of Aircraft Electronics", Journal of Guidance, Control, and Dynamics, vol. 26, No. 2, Mar.-Apr. 2003, pp. 193-213.
Mayo., "A Low-Cost Conformal Phased Array Satellite Antenna for Trains", Institution of Engineering and Technology Satellite Sys-

(56) References Cited

OTHER PUBLICATIONS tems and Applications Network, pp. 105-114.
McIlvenna et al., "EHF Monolithic Phased Arrays—A Stepping-Stone to the Future", 1988 IEEE, pp. 0731-0735.
Notice of Allowance received in GB Application No. 0813237.5 dated Oct. 26, 2010; 3 pages.
Office Action received in U.S. Appl. No. 12/988,923 dated Sep. 16, 2015; 15 pages.
Reddick III et al., "High Density Microwave Packaging Program Phase 1—Texas Instrument/Martin Marietta Team", 1995 IEEE, TU3D-2, pp. 173-176.
Schreiner et al., "Architecture and Interconnect Technologies for a Novel Conformal Active Phased Array Radar Module", IFTU-33, pp. 567-570.
Search Report received in GB Application No. 0813237.5 dated Apr. 23, 2009; 1 page.
Search Report received in GB Application No. 0813237.5 dated Oct. 8, 2008; 2 pages.
Search Report received in GB Application No. 1013049.0 dated Nov. 17, 2010; 1 page.
Search Report received in GB Application No. 1215114.8 dated Dec. 19, 2012; 6 pages.
Search Report received in GB Application No. 1403507.5 dated Sep. 4, 2014; 2 pages.
Tang et al., "Array Technology", Proceedings of the IEEE, vol. 80, No. 1, Jan. 1992, pp. 173-182.
Whicker et al., "RF-Wafer Scale Integration: A New Approach to Active phased Arrays+", 1992 IEEE, Session 11: WSI Application III, pp. 291-299.
Whicker et al., "RF-Wafer Scale Integration: A New Approach to Active Phased Arrays", APMC'93, vol. 1, pp. 1-1-1-4.
Whicker., "Active Phased Array Technology Using Coplanar Packaging Technology", IEEE Transactions on Antennas and Propagation, vol. 43, No. 9, Sep. 1995, pp. 949-952.
Wong et al., "An EHF Backplate Design for Airborne Active Phased Array Antennas", 1991 IEEE, OO-2, pp. 1253-1256.
Zimmerman et al., "Equipment Cooling Systems for Aircraft Part 1 Summary of Cooling System Study", WADC Technical Report 54-359, Sep. 1954.

* cited by examiner

APPARATUS COMPRISING AN ANTENNA ARRAY

FIELD

The present invention relates to apparatus comprising an antenna array.

BACKGROUND

In a phased array antenna as described, for example, in WO 2010/007442 A1, the phase of baseband or intermediate frequency (IF) signals associated with each antenna element can be controlled in such a way as to enable the phased array antenna to automatically align with a transmission source such as a satellite. This control can be achieved, for example, by adjusting the phase of an oscillator used to demodulate the received radio frequency (RF) signals.

SUMMARY

According to a first aspect of the present invention, there is provided apparatus comprising:
an antenna array;
a plurality of units, each unit configured to mix a radio frequency signal from one or more of the antennas with oscillating signals having phases defined by a global signal and to provide in-phase and quadrature-phase signals;
a constellation rotation system configured to, for each unit, rotate a constellation point associated with the in-phase and quadrature-phase signals by a rotation angle to provide adjusted in-phase and quadrature-phase signals;
signal buses for global in-phase and quadrature-phase signals configured to receive the adjusted in-phase and quadrature-phase signals, respectively, from a plurality of the units; and
a feedback system configured to, for each unit, compare one or more of the adjusted in-phase and quadrature-phase signals with one or more of the global in-phase and quadrature-phase signals to determine an error in the rotation angle.

According to a second aspect of the present invention, there is provided a method comprising, for each of a plurality of radio frequency signals from an antenna array:
mixing the radio frequency signal with oscillating signals having phases defined by a global signal and providing local in-phase and quadrature-phase signals;
rotating a constellation point associated with the local in-phase and quadrature-phase signals by a rotation angle to provide adjusted in-phase and quadrature-phase signals;
adding the adjusted in-phase and quadrature-phase signals to global in-phase and quadrature-phase signals, respectively; and
comparing one or more of the adjusted in-phase and quadrature-phase signals with one or more of the global in-phase and quadrature-phase signals to determine an error in the rotation angle.

Thus, an alternative way of adjusting in-phase and quadrature-phase signals can be provided. Furthermore, since the apparatus has fewer high-frequency (e.g. RF and/or IF) elements involved in adjusting the signals, the apparatus can be more cost efficient to produce and/or can perform more effectively (e.g. have a higher signal-to-noise ratio).

Optional features are specified in the dependent claims.

BRIEF DESCRIPTION OF THE DRAWINGS

Certain embodiments of the present invention will now be described, by way of example only, with reference to the accompanying drawings in which.

DETAILED DESCRIPTION OF THE CERTAIN EMBODIMENTS

Phased Array Antenna

Figure 1A:
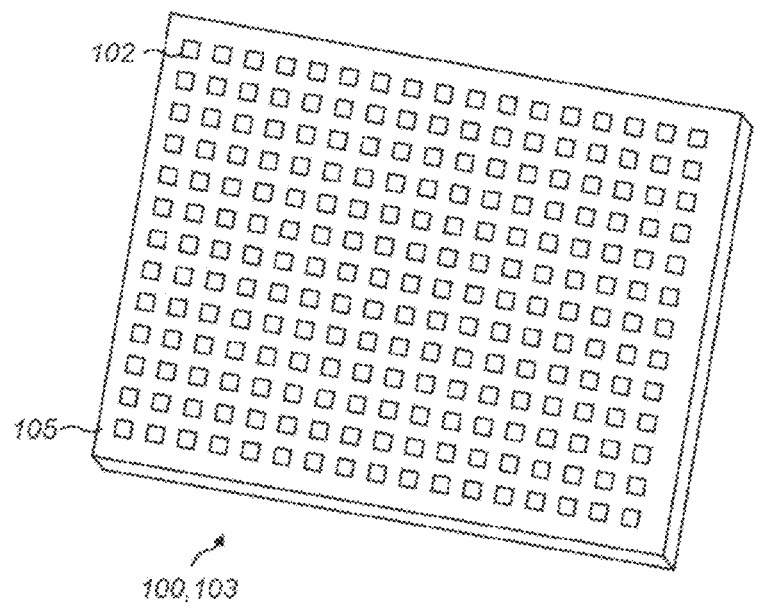
FIG. 1A illustrates a phased array antenna.
Figure 1B:
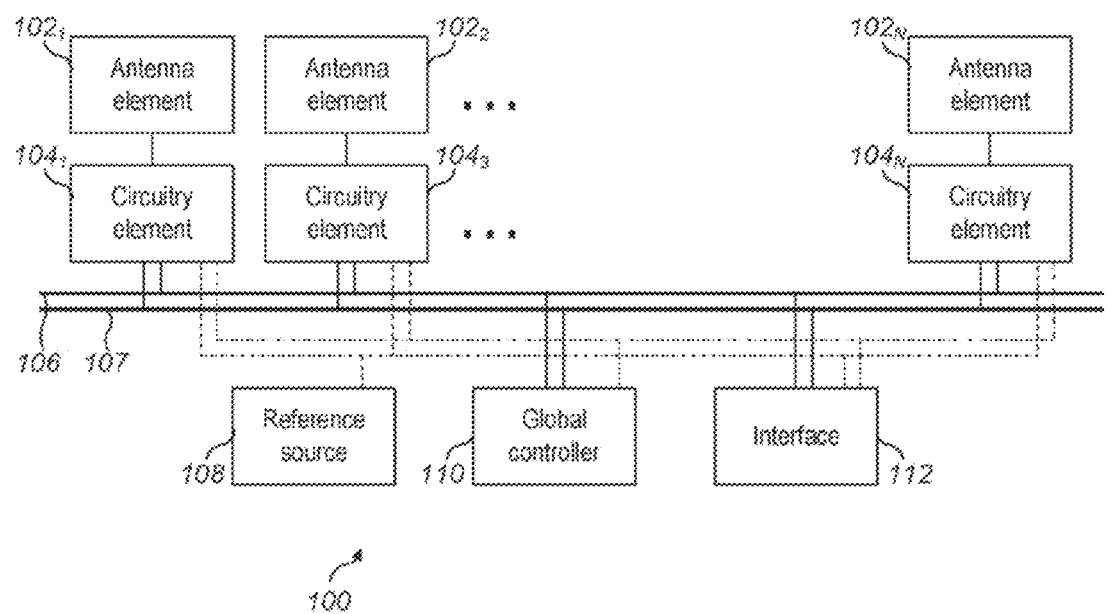
FIG. 1B illustrates components of the phased array antenna of FIG. 1A.

Referring in particular to FIGS. 1A and 1B, a phased array antenna 100 (hereinafter referred to as an antenna) will now be described.

The antenna 100 is preferably configured to receive satellite communications signals comprising data signals which are quadrature-modulated onto RF carrier waves. The modulation scheme may be, for example, quadrature phase shift keying (QPSK). Examples of such signals are described in European standard ETSI EN 302 307 V1.2.1 (2009 August).

The antenna 100 is preferably further configured to transmit signals. However, features associated with transmission are generally not described herein.

Referring in particular to FIG. 1A, the antenna 100 includes a plurality of antenna elements $102_1 \ldots 102_N$ for receiving RF signals. For example, the antenna 100 may include tens or hundreds of antenna elements 102. The antenna 100 may include one or more antenna modules 103 (hereinafter referred to as panels). In this example, the antenna 100 only includes one panel 103. In other examples, the antenna may include more panels 103, for example in order to increase a maximum data throughput. Each panel 103 includes an enclosure 105 which has a thin (e.g. 1-inch high) cuboid shape. Thus, the antenna 100 has a form factor which can be particularly advantageous for installing e.g. on vehicles, where protrusions are preferably minimised. The antenna elements 102 are preferably included on one of two major surfaces (e.g. a top surface) of the enclosure 105, and circuitry (not shown in this figure) is preferably included in the interior of the enclosure 105.

Referring in particular to FIG. 1B, the antenna 100 includes a plurality of circuitry elements $104_1 \ldots 104_N$. Preferably, each antenna element 102 is operatively connected to one circuitry element 104 and vice versa. However, this need not be the case. The antenna 100 includes first and second signal buses 106, 107. The first signal bus 106 is for carrying a global in-phase signal, and the second signal bus 107 is for carrying a global quadrature-phase signal. Each signal bus 106, 107 preferably includes a differential pair (denoted by bold lines). This enables the global signals to have higher signal-to-noise ratios. Each circuitry element 104 is operatively connected to the first and second signal buses 106, 107. The antenna 100 includes a source 108 (hereinafter referred to as a reference source) of a signal (hereinafter referred to as a reference signal) oscillating with a certain frequency and phase. In this example, the reference signal has a frequency corresponding to the carrier frequency of the signals which the antenna 100 is configured to receive. In other examples, the reference signal may have a different frequency. The reference source 108 may include a frequency synthesiser configured to generate the reference signal from a lower-frequency signal. Each circuitry element 104 is operatively connected to the reference source 108. The antenna 100 preferably includes circuitry 110 (hereinafter referred to as a global controller) configured to perform functions which will be described below. Each circuitry element 104 is operatively connected to the global controller 110. The antenna 100 preferably includes an interface 112. The interface 112 is preferably operatively connected to the first and second signal buses 106, 107, the reference source 108 and the controller 110. The interface 112 is also connectable to an external device such as a data processing device.

Circuitry Element

Figure 2:
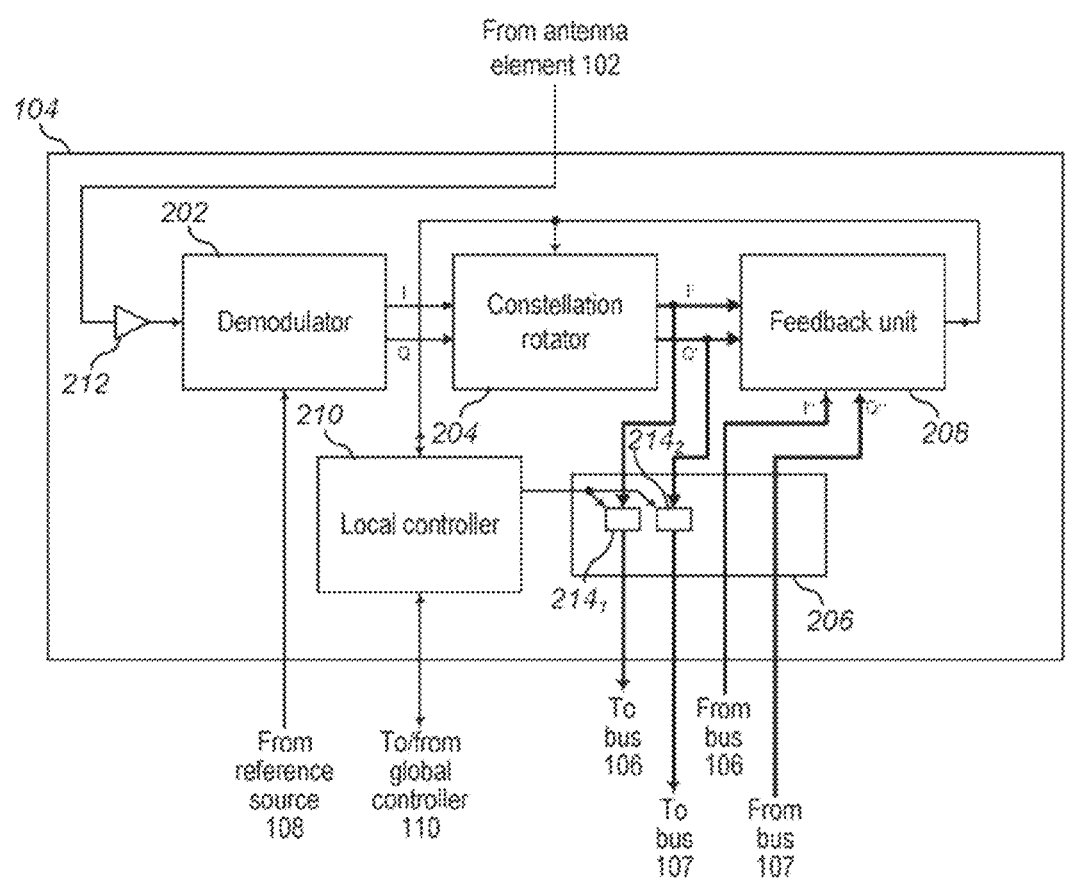
FIG. 2 illustrates one of a plurality of circuitry elements included in the phased array antenna of FIGS. 1A and 1B.

Referring in particular to FIG. 2, one of the circuitry elements 104 will now be described in more detail.

The circuitry element 104 is configured to receive an RF signal from the antenna element 102 to which it is operatively connected and to provide adjusted in-phase and quadrature-phase signals to the first and second signal buses 106, 107, respectively. The global in-phase and quadrature-phase signals carried by the first and second signal buses 106, 107, respectively, correspond to a superposition of the adjusted in-phase and quadrature-phase signals, respectively, provided by a plurality of the circuitry elements 104. The adjusted in-phase and quadrature-phase signals are continually adjusted to maximise the degree to which they are correlated with (or, in other words, temporally aligned with) the global in-phase and quadrature-phase signals.

The circuitry element 104 comprises first circuitry 202 (hereinafter referred to as a demodulator), second circuitry 204 (hereinafter referred to as a constellation rotator), third circuitry 206 (hereinafter referred to as an interface), fourth circuitry 208 (hereinafter referred to as a feedback unit) and fifth circuitry 210 (hereinafter referred to as a local controller).

The demodulator 202 is configured to receive the RF signal from the antenna element 102. The circuitry element 104 preferably comprises an amplifier 212, e.g. a low noise amplifier, configured to amplify the RF signal. The demodulator 202 is configured to receive the reference signal from the reference source 108. The demodulator 202 is configured to provide local in-phase and quadrature-phase signals (denoted by I and Q, respectively) to the constellation rotator 204. In this example, the local in-phase and quadrature-phase signals are baseband signals.

The constellation rotator 204 is configured to provide adjusted in-phase and quadrature-phase signals (denoted by I' and Q', respectively) to the interface 206 and to the feedback unit 208.

The interface 206 is configured to provide the adjusted in-phase and quadrature-phase signals to the first and second signal buses 106, 107, respectively. The interface 206 is further configure to provide the global in-phase and quadrature-phase signals (denoted by I" and Q", respectively) from the first and second signal buses 106, 107, respectively, to the feedback unit 208.

The feedback unit 208 is configured to provide a feedback signal to the local controller 210. Generally, a corresponding feedback signal is provided to the constellation rotator 204.

The local controller 210 is configured to communicate with one or more components of the circuitry element 104, e.g. the interface 206 and the feedback unit 208, and with the global controller 110, as will be described in more detail below.

Demodulator

Figure 3:
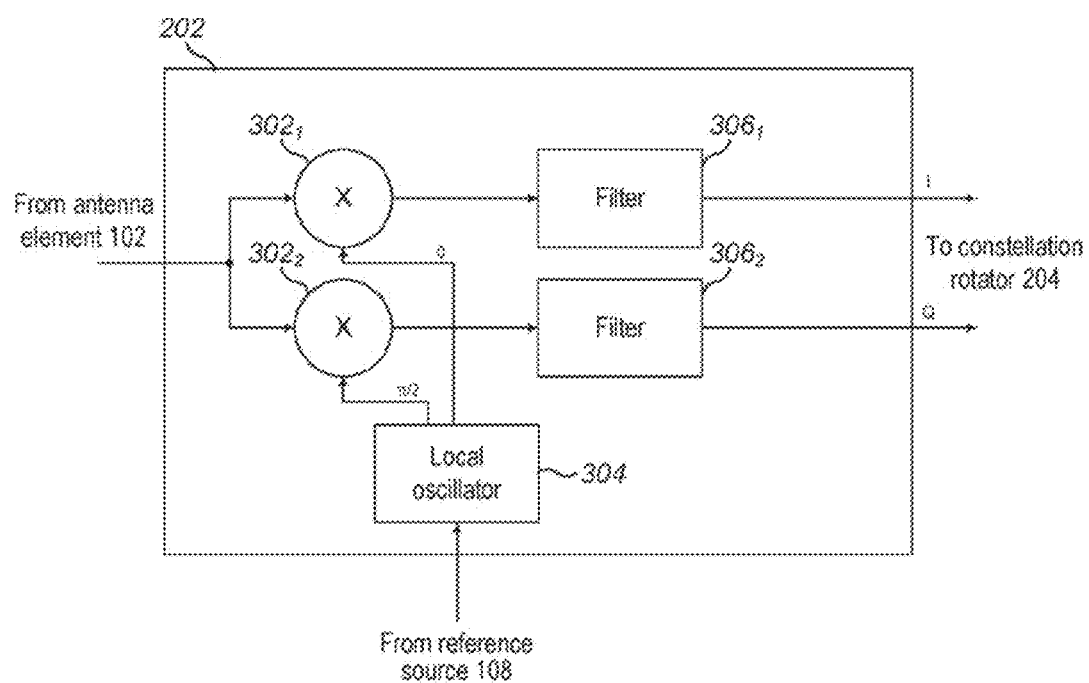
FIG. 3 illustrates a demodulator included in the circuitry element of FIG. 2.

Referring in particular to FIG. 3, the demodulator 202 will now be described in more detail.

The demodulator 202 is configured to mix the RF signal from the antenna element 102 with first and second oscillating signals having phases defined by the reference signal from the reference source 108 and to provide the local in-phase and quadrature-phase signals.

The demodulator 202 includes first and second mixers $302_1$, $302_2$ and circuitry 304 (hereinafter referred to as a local oscillator). The local oscillator 304 is configured to receive the reference signal from the reference source 108 and to provide the first and second oscillating signals to the first and second mixers $302_1$, $302_2$, respectively. The first and second oscillating signals are preferably sinusoidal signals. Each of the first and second oscillating signals has the same frequency as the reference signal and has a constant phase relationship to the reference signal. For example, the phase of the first oscillating signal may be substantially the same as the phase of the reference signal. The second oscillating signal is offset, e.g. delayed, in phase by $\pi/2$ radians relative to the first oscillating signal. The local oscillator 304 preferably includes a phase-locked loop. The first and second mixers $302_1$, $302_2$ are configured to mix the RF signal from the antenna element 102 with the first and second oscillating signals, respectively.

The demodulator 202 includes first and second filters $306_1$, $306_2$. The first and second filters $306_1$, $306_2$ are configured to filter the output signals of the first and second mixers $302_1$, $302_2$, respectively. Each filter $306_1$, $306_2$ is preferably configured to at least partly remove frequency components outside a certain baseband. This includes at least partly removing the sum frequency components produced by the first or second mixer $302_1$, $302_2$. The output signals of the first and second filters $306_1$, $306_2$ correspond to the local in-phase and quadrature-phase signals, respectively Various other modifications may be made to the demodulator 202. For example, the demodulator 202 may include first and second analogue-to-digital converters (ADCs) configured to convert the analogue output signals of the first and second filters $306_1$, $306_2$, respectively, to digital signals. Each ADC may include a quantiser.

Constellation Rotator

Figure 4A:
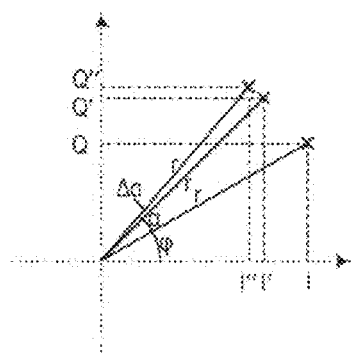
FIG. 4A illustrates a constellation rotation.
Figure 4B:
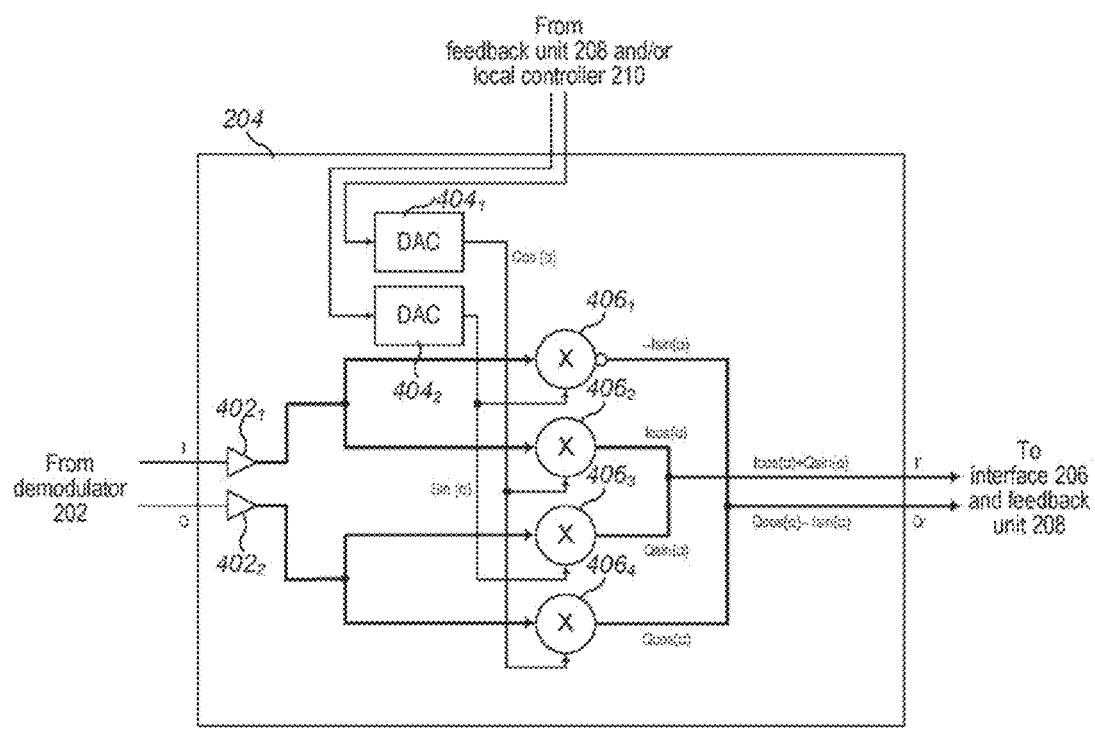
FIG. 4B illustrates a constellation rotator included in the circuitry element of FIG. 2.

Referring in particular to FIGS. 4A and 4B, the constellation rotator 204 will now be described in more detail.

The constellation rotator 204 is configured to rotate a constellation point associated with the local in-phase and quadrature-phase signals from the demodulator 202 by an angle indicated by a feedback signal generally originating from the feedback unit 208, thereby providing the adjusted in-phase and quadrature-phase signals.

As Illustrated in FIG. 4A, the local in-phase and quadrature-phase values (I,Q) may be associated with a constellation point with polar co-ordinates $(r,\phi)$, wherein $I=r\cos(\phi)$ and $Q=r\sin(\phi)$. As will be explained in more detail below, the feedback signal is generally indicative of a phase difference α between the local and the global signals and hence an angle −α by which the local signals should be rotated to temporally align them with the global signals. α is preferably defined to be an angle between −π and +π radians, wherein positive values correspond to the local signals being in advance of the global signals. Rotating the constellation point associated with the local signals by an angle −α provides a rotated constellation point with polar co-ordinates (r, φ−α). The adjusted in-phase (I') value associated with the rotated constellation point may be expressed as:

$$I'=r\cos(\phi-\alpha)=r\cos(\phi)\cos(\alpha)+r\sin(\phi)\sin(\alpha)=I\cos(\alpha)+Q\sin(\alpha).$$

The adjusted quadrature-phase (Q') value associated with the rotated constellation point may be expressed as:

$$Q'=r\sin(\phi-\alpha)=r\sin(\phi)\cos(\alpha)-r\cos(\phi)\sin(\alpha)=Q\cos(\alpha)-I\sin(\alpha).$$

In other words, the adjusted in-phase and quadrature-phase signals respectively correspond to first and second weighted sums of the local in-phase and quadrature-phase signals, the weights thereof corresponding to suitable trigonometric functions of the angle α.

As will be described in more detail below, the feedback unit 208 is configured to detect a phase difference between the adjusted and global signals and hence an error $\Delta\alpha$ in the current angle α. The feedback unit 208 is configured to update the angle accordingly to $\alpha+\Delta\alpha$.

In other examples, other equivalent functions may be used to obtain the same or similar adjusted in-phase and quadrature-phase values. Approximate functions, e.g. approximations of the trigonometric functions, may also be used. Furthermore, other functions, e.g. other types of weighted sums (or other combinations) of local in-phase and quadrature-phase signals, may be used, particularly in combination with a suitably-configured feedback unit 208.

Referring in particular to FIG. 4B, in this example, the constellation rotator 204 comprises circuitries $402_1$, $402_2$ configured to convert the local in-phase and quadrature-phase signals, respectively, from voltage signals to differential current signals. In other examples, the signals from the demodulator 202 may be in a different form and/or the constellation rotator 204 may be configured to operate with signals in a different form.

In this example, the feedback signal comprises a first feedback signal which is a digital signal representing the cosine of the phase difference between the local and global signals and a second feedback signal which is digital signal representing the sine of this phase difference. The constellation rotator 204 includes first and second DACs $404_1$, $404_2$ configured to convert the first and second feedback signals, respectively, to analogue signals. Each analogue signal may correspond to a voltage signal with a certain range, e.g. between −1 and +1 volts. In other examples, the first and second DACs $404_1$, $404_2$ may be included in another part of the antenna 100. In some examples, the constellation rotator 204 may be configured to determine the cosine and the sine of the angle.

The constellation rotator 204 includes first, second, third and fourth multipliers $406_1$, $406_2$, $406_3$, $406_4$. The output signal from the first DAC $404_1$ is provided to inputs of the second and fourth multipliers $406_2$, $406_4$. The output signal from the second DAC $404_2$ is provided to inputs of the first and third multipliers $406_1$, $406_3$. The local in-phase signal is provided to inputs of the first and second multipliers $406_1$, $406_2$. The local quadrature-phase signal is provided to inputs of the third and fourth multipliers $406_3$, $406_4$. Each of the output signals of first, second, third and fourth multipliers $406_1$, $406_2$, $406_3$, $406_4$ is a differential current signal. The output signal of the first multiplier $406_1$ is inverted. The output signal of the second multiplier $406_2$ is added to the output signal of the third multiplier $406_3$ to produce the adjusted in-phase signal. The inverted output signal of the first multiplier $406_1$ is added to the output signal of the fourth multiplier $406_4$ to produce the adjusted quadrature-phase signal.

Various other modifications may be made to the constellation rotator 204. For example, the same functions may be implemented using a different combination of analogue and/or digital elements. Where different functions are used to determine the adjusted in-phase and quadrature-phase signals, as described above, the constellation rotator 204 may be configured accordingly.

Instead of a single constellation rotator 204, the circuitry element 102 may comprise a first constellation rotator configured to provide adjusted in-phase and quadrature-phase signals to the interface 206 and a second constellation configured to provide adjusted in-phase and quadrature-phase signals to the feedback unit 208.

Interface

Referring in particular to FIG. 2, the interface 206 will now be described in more detail.

The interface 206 is preferably configured to selectively provide the adjusted in-phase and quadrature-phase signals to the first and second buses 106, 107, respectively. As will be explained in more detail below, this can enable the integrity of the global signals to be preserved, for example even if there is an irregularity with one or more of the antenna elements 102 and/or circuitry elements 104. The interface 206 comprises first and second circuitries $214_1$, $214_2$ (hereinafter referred to as switches). Each of the first and second switches $214_1$, $214_2$ is configured to receive a signal (hereinafter referred to as an inhibit signal) from the global controller 110 and/or the local controller 210 and to control whether or not the adjusted signal is provided to the signal bus 106, 107 accordingly.

Various other modifications may be made to the interface 206. For example, the interface 206 may include third and fourth circuitries configured to convert the global in-phase and quadrature-phase signals, respectively, from differential current signals to voltage signals. The interface 206 may be configured to weight the adjusted in-phase and quadrature-phase signals.

Feedback Unit

Figure 5A:
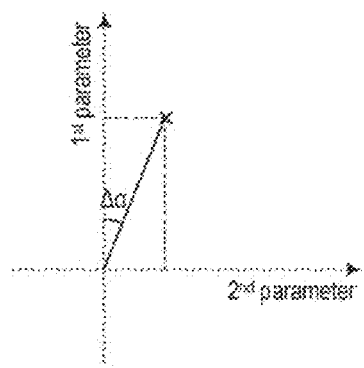
FIG. 5A illustrates a determination of an error in a rotation angle.
Figure 5B:
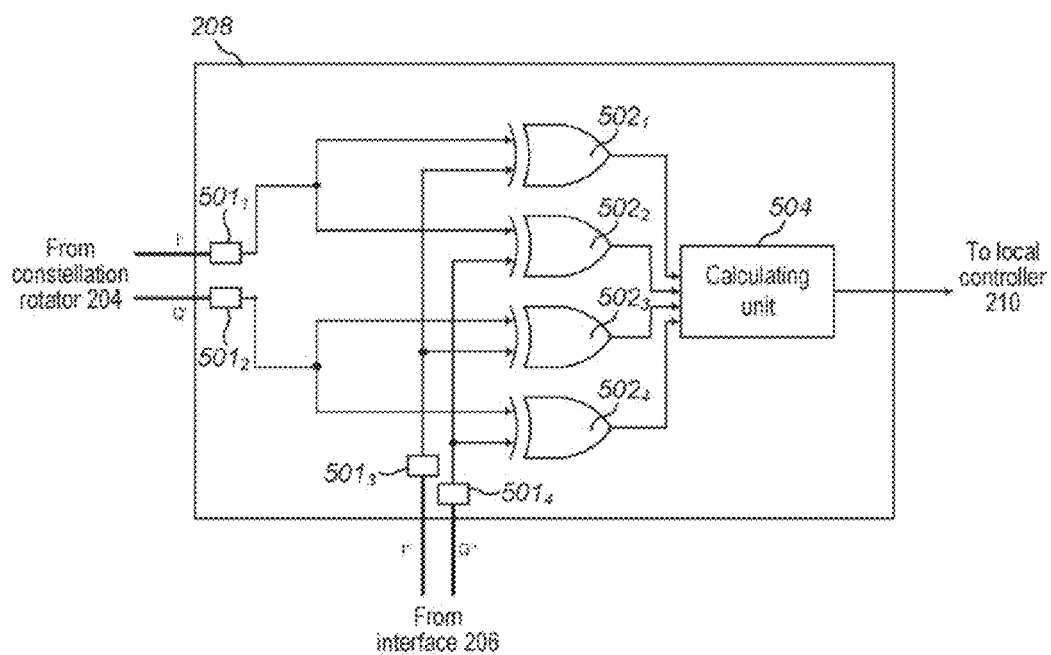
FIG. 5B illustrates a feedback unit included in the circuitry element of FIG. 2.

Referring in particular to FIGS. 5A and 5B, the feedback unit 208 will now be described in more detail.

The feedback unit 208 is configured to compare one or more of the adjusted in-phase and quadrature-phase signals with one or more of the global in-phase and quadrature-phase signals to determine the phase difference between the adjusted and global signals and hence the error in the angle used by the constellation rotator 204.

In this example, the feedback unit 208 is configured to compare the adjusted in-phase signal with the global in-phase signal and to compare the adjusted quadrature-phase signal with the global quadrature-phase signal to determine a first parameter indicative of a degree of correlation between the adjusted and global signals. In other examples, only one of these comparisons may be used to determine the first parameter. Furthermore, in this example, the feedback unit 208 is configured to compare the adjusted in-phase signal with the global quadrature-phase signal and to compare the adjusted quadrature-phase signal with global in-phase signal to determine a second parameter indicative of a degree of correlation between the in-phase and quadrature-phase signals. In other examples, only one of these comparisons may be used to determine the second parameter.

Because, in the original signal, the in-phase and quadrature-phase signals are independent of each other, i.e. orthogonal, any correlation between, for example, the adjusted in-phase signal and the global quadrature-phase signal is indicative of 'cross-contamination' between the in-phase and quadrature-phase signals due to a phase difference between the adjusted and global signals.

The feedback unit 208 is preferably configured to determine the phase difference between the adjusted and global signals as a function of the first and second parameters, in particular as a suitable inverse trigonometric function of a combination of the first and second parameters.

Referring in particular to FIG. 5A, if the first parameter (indicative of a degree of correlation between the adjusted and global signals) is plotted on the y-axis and the second parameter (indicative of a degree of correlation between the in-phase and quadrature-phase signals) is plotted on the x-axis, then the phase difference between the adjusted and global signals (denoted by $\Delta\alpha$) may be determined to be the angle between the (vertical) line which is the positive part of the y-axis and the line from the origin to the point whose y- and x-coordinates are defined by the first and second parameters, respectively. The angle is preferably defined such that is between $-\pi$ and $+\pi$ radians, wherein positive values correspond to the adjusted signals being in advance of the global signals. In this example, the second parameter is determined such that it is positive if the adjusted signals are in advance of the global signals. Accordingly, the angle corresponds to the arctangent of the ratio of the second parameter to the first parameter for angles between $-\pi/4$ and $+\pi/4$ radians, by $\pi$ minus the arctangent of the ratio of the first parameter to the second parameter for angles between $+\pi/4$ and $+3\pi/4$ radians, and so forth.

Referring in particular to FIG. 5B, the feedback unit 208 comprises first, second, third and fourth circuitries $501_1$, $501_2$, $501_3$, $501_4$. The first, second, third and fourth circuitries $501_1$, $501_2$, $501_3$, $501_4$ are configured to convert the adjusted in-phase and quadrature-phase signals from the constellation rotator 204 and the global in-phase and quadrature-phase signals from the interface 206, respectively, from differential current signals to voltage signals. Each of the circuitries $501_1$, $501_2$, $501_3$, $501_4$ is also configured to 1-bit quantise the signal. In particular, each of the circuitries $501_1$, $501_2$, $501_3$, $501_4$ is configured to provide an output signal with a binary value, e.g. a high or low voltage signal, which depends upon whether an input signal is above or below a certain threshold level. In other examples, the signals may be provided in a different form and/or the feedback unit 208 may be configured to operate in relation to signals in a different form.

The feedback unit 208 comprises first, second, third and fourth exclusive-or (XOR) gates $502_1$, $502_2$, $502_3$, $402_4$. The 1-bit-quantised adjusted and global in-phase signals are provided to the inputs of the first XOR gate $502_1$. The 1-bit-quantised adjusted and global quadrature-phase signals are provided to the inputs of the third XOR gate $502_3$. The 1-bit-quantised adjusted in-phase signal and the global quadrature-phase signal are provided to the inputs of the second XOR gate $502_3$. The 1-bit-quantised adjusted quadrature-phase signal and the global in-phase signal are provided to the inputs of the fourth XOR gate $502_4$.

The output signals of the first, second, third and fourth XOR gates $502_1$, $502_2$, $502_3$, $404_4$ are provided to circuitry 504 (hereinafter referred to as calculating unit) configured to determine the phase difference between the adjusted and global signals. The calculating unit 504 comprises first and second counters (not shown). The counters are clocked with a suitable frequency, e.g. a frequency similar to the baseband symbol rate. The clocking need not be synchronised with the baseband symbols.

The output signals of the first and third XOR gates $502_1$, $502_3$ are provided to the first counter, which is configured to provide a signal which corresponds to the first parameter. The first counter is incremented by 1 if (when the counter is clocked) the output signal of the first XOR gate $502_1$ is high, i.e. if the adjusted and global in-phase signals are the same, i.e. both high or both low. Otherwise, the first counter is decremented by 1. The first counter is incremented by 1 if (when the counter is clocked) the output signal of the third XOR gate $502_3$ is high, i.e. if the adjusted and global quadrature-phase signals are the same. Otherwise, the first counter is decremented by 1.

The output signals of the second and fourth XOR gates $502_2$, $502_4$ are provided to the second counter, which is configured to provide a signal which corresponds to the second parameter. The second counter is incremented by 1 if (when the counter is clocked) the output signal of the second XOR gate $502_2$ is high, i.e. if the adjusted in-phase signal and the global quadrature-phase signal are the same. Otherwise, the second counter is decremented by 1. The second counter is incremented by 1 if (when the counter is clocked) the output signal of the fourth XOR gate $502_4$ is high, i.e. if the adjusted quadrature-phase signal and the global in-phase signal are the same. Otherwise, the second counter is decremented by 1.

In some examples, the calculating unit 504 is configured to use the values of the first and second counters, i.e. the first and second parameters, when one of the first and second counters reaches full scale (either positive or negative). In other examples, the calculating unit 504 may use the values of the first and second counters at different instances, e.g. periodically. After using the values of the first and second counters, the calculating unit 504 is configured to reset the first and second counters. The calculating unit 504 is also preferably configured to reset the first and second counters in response to a signal (hereinafter referred to as a reset signal) from the global controller 110 and/or the local controller 210, as will be described below. The calculating unit 504 is configured to determine the phase difference between the adjusted and global signals and hence the error in the current rotation angle from the first and second parameters as described above. The calculating unit 504 is configured to update the rotation angle to correct for the error therein and provide a feedback signal indicative of the updated rotation angle to the constellation rotator 204.

Various other modifications may be made to the feedback unit 208. For example, instead of the XOR gates $502_1$, $502_2$, $502_3$, $404_4$, the feedback unit 208 may include different types of comparators.

Global and Local Controllers

Referring in particular to FIG. 2, the global controller 110 and the local controller 210 will now be described.

The global controller 110 and the local controller 210 are configured to communicate with one another and together to perform several control functions.

The global controller 110 is preferably configured to receive the feedback signal from the feedback unit 208 via the local controller 210, and to provide a corresponding feedback signal to the constellation rotator 204 via the local controller 210. The local controller 210 may merely forward these signals or it may modify them, e.g. by calculating the sine and cosine of the rotation angle. The global controller 110 is configured to set initial values of the rotation angles for the plurality of circuitry elements $104_1 \ldots 104_N$. As will be appreciated, these values may be determined based upon information about an approximate position of a transmission source, e.g. a satellite. In this way, the antenna 100 can be initially aligned with the transmission source. This can be performed when the antenna 100 is initialised and/or in response to an event, e.g. a selection of a new transmission source. Thereafter, the rotation angles are determined by the feedback units 208 as described above, and the antenna 100 automatically precisely aligns with the transmission source.

The global controller 110 and/or the local controller 210 is/are preferably configured to provide an inhibit signal to control selective provision of the adjusted in-phase and quadrature-phase signals to the first and second buses 106, 107, respectively, as described above. The inhibit signal may be provided in response to information from the feedback unit 208 meeting one or more criteria. For example, the inhibit signal may be provided when the first parameter indicative of the degree of correlation between the adjusted and global signals is below a certain threshold value for a certain amount of time. The inhibit signal may also be provided in response to a user command.

The global controller 110 and/or the local controller 210 is/are configured to provide a reset signal to cause the calculating unit 504 in the feedback unit 208 to reset the first and second counters, as described above. The global controller 110 and/or the local controller 210 is/are preferably configured to provide the reset signal when the antenna 100 is initialised and/or in response to an event, e.g. a selection of a new satellite.

Process Performed by the Apparatus

Figure 6:
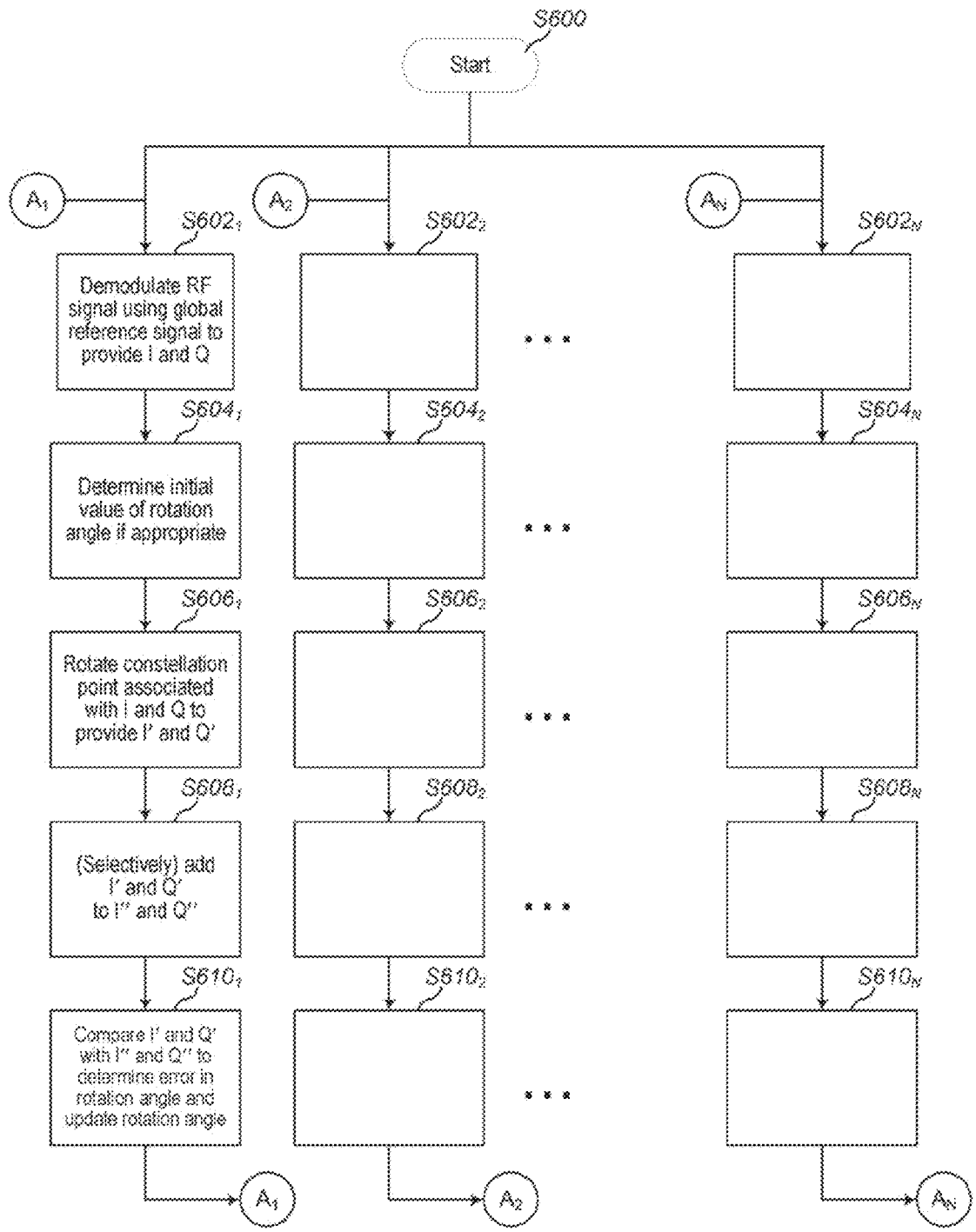
FIG. 6 illustrates a process performed by the phased array antenna of FIGS. 1A and 1B.

Referring to FIG. 6, a process performed by the apparatus 100 will now be described.

The process starts at step S600. The subsequent steps are performed for each of a plurality of radio frequency signals from an antenna array.

At a first step S602, the RF signal is demodulated using a global reference signal. In particular, the RF signal is mixed with first and second oscillating signals having phases defined by the global reference signal. Thus, local in-phase and quadrature-phase signals (I and Q) are provided.

At a second step S604, an initial value of a rotation angle is determined if appropriate, for example if the antenna 100 has been initialised. The initial value may be determined based, for example, upon information about a position of a transmission source.

At a third step S606, a constellation point associated with the local in-phase and quadrature-phase signals is rotated by the rotation angle. Thus, adjusted in-phase and quadrature-phase signals (I' and Q') are provided. The adjusted in-phase and quadrature-phase signals preferably respectively correspond to first and second weighted sums of the local in-phase and quadrature-phase signals, the weights thereof corresponding to suitable trigonometric functions of the rotation angle.

At a fourth step S608, the adjusted in-phase and quadrature-phase signals are added to global in-phase and quadrature-phase signals (I" and Q"), respectively. The adding is preferably selective. For example, the adjusted signals are not added if one or more certain criteria are met.

At a fifth step S610, the adjusted and global signals are compared to determine the phase difference therebetween and hence the error in the rotation angle. The comparing preferably includes comparing the adjusted in-phase signal with the global in-phase signal and the adjusted quadrature-phase signal with global quadrature-phase signal to determine a first parameter indicative of a degree of correlation between the adjusted and global signals. The comparing preferably also includes comparing the adjusted in-phase signal with the global quadrature-phase signal and the adjusted quadrature-phase signal with global in-phase signal to determine a second parameter indicative of a degree of correlation between the in-phase and quadrature-phase signals. The error in the rotation angle is then preferably determined as a suitable inverse trigonometric function of a combination of the first and second parameters. The rotation angle is then updated to take account of the error therein.

The process then returns to step S602.

MODIFICATIONS

It will be appreciated that many other modifications may be made to the embodiments hereinbefore described.

Structural or functional features described as being included in or associated with certain components or modules of the antenna 100 may instead be included in one or more other components or modules of the antenna 100.

For example, the calculating unit 504 and the local controller 210 may form part of the same circuitry.

Furthermore, some or all of the operations relating to the processing of digital signals may be performed in the same circuitry, e.g. in the global controller 110. This may include operations described above as being performed by the constellation rotator 204 and the feedback unit 208. In such examples, the required signalling between, for example, the circuitry element 104 and the global controller 110 is at baseband and so is not subject to the disadvantages, e.g. related to noise, which are associated with signalling at higher frequencies.

Instead of corresponding to a homodyne receiver, the circuitry element 104 may correspond to a heterodyne receiver. In such examples, the demodulator 202 may be configured to provide local in-phase and quadrature IF signals, which may be processed by the other components of the circuitry element 104 equivalently to as described above. The signal buses 106, 107 may be configured to carry global IF signals, which may be subsequently demodulated.

The antenna 100 may include one or more further components.

The antenna 100 may include any suitable ones of the features of any of the phased array antennas described in WO 2010/007442 A1, in addition to, or instead of, the features described herein. For example, instead of the feedback unit 208, the antenna 100 may include the phase feedback arrangement 536 of FIG. 5 of WO 2010/007442 A1.

The antenna 100 may be configured to rotate the constellation using a controllable oscillator as described in WO 2010/007442 A1.

As used in this application, the term circuitry refers to all of the following:

(a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus to perform various functions) and (c) to circuits, such as a microprocessor(s) or a portion of a microprocessor(s), that require software or firmware for operation, even if the software or firmware is not physically present.

The invention claimed is:

1. Apparatus, comprising:
   an antenna array comprising a plurality of antenna elements,
   a plurality of circuit units, each unit configured to mix a radio frequency signal from one or more of the antenna elements with oscillating signals having phases defined by a global reference signal and to provide local in-phase and quadrature-phase signals;
   a constellation rotation system configured to, for each unit, rotate a constellation point associated with the local in-phase and quadrature-phase signals by a rotation angle—based on comparison of the local in-phase and quadrature-phase signals with one or more global in-phase and quadrature-phase signals to provide adjusted in-phase and quadrature-phase signals;
   signal buses for global in-phase and quadrature-phase signals configured to receive the adjusted in-phase and quadrature-phase signals, respectively, from a plurality of the units; and
   a feedback system configured to, for each unit, compare one or more of the adjusted in-phase and quadrature-phase signals with one or more of the global in-phase and quadrature-phase signals to determine an error in the rotation angle,
   wherein said global in-phase and quadrature-phase signals correspond to a superposition of the adjusted in-phase and quadrature-phase signals provided by said circuit units.

2. Apparatus according to claim 1, wherein the feedback system is configured to:
   perform at least one of a comparison of the adjusted in-phase signal with the global in-phase signal and a comparison of the adjusted quadrature-phase signal with the global quadrature-phase signal to determine a first parameter indicative of a degree of correlation therebetween;
   perform at least one of a comparison of the adjusted in-phase signal with the global quadrature-phase signal and a comparison of the adjusted quadrature-phase signal with global in-phase signal to determine a second parameter indicative of a degree of correlation therebetween; and
   determine the error in the rotation angle as a function of the first and second parameters.

3. Apparatus according to claim 2, wherein the error in the rotation angle is a suitable inverse trigonometric function of a combination of the first and second parameters.

4. Apparatus according to claim 1, wherein the feedback system is configured to compare the signals using an exclusive-or gate.

5. Apparatus according to claim 1, wherein the adjusted in-phase and quadrature-phase signals respectively correspond to first and second weighted sums of the in-phase and quadrature-phase signals.

6. Apparatus according to claim 5, wherein the weights in the first and second weighted sums correspond to suitable trigonometric functions of the rotation angle.

7. Apparatus according to claim 6, wherein the weights of the in-phase and quadrature-phase signals in the first weighted sum respectively correspond to the cosine of the rotation angle and the sine of the rotation angle, and the weights of the in-phase and quadrature-phase signals in the second weighted sum respectively correspond to minus one multiplied by the sine of the rotation angle and the cosine of the rotation angle.

8. Apparatus according to claim 1, wherein the apparatus is configured to selectively provide the adjusted in-phase and quadrature-phase signals to the signal buses.

9. Apparatus according to claim 1, wherein each of the signal buses carries differential current signals.

10. A method comprising, for each of a plurality of radio signals from antenna elements of an antenna array:
    mixing the radio frequency signal with oscillating reference signals having phases defined by a global signal and providing in-phase and quadrature-phase signals;
    rotating a constellation point associated with the in-phase and quadrature-phase signals by a rotation angle to provide adjusted in-phase and quadrature-phase signals;
    adding the adjusted in-phase and quadrature-phase signals to global in-phase and quadrature-phase signals, respectively; and
    comparing one or more of the adjusted in-phase and quadrature-phase signals with one or more of the global in-phase and quadrature-phase signals to determine an error in the rotation angle.

11. A method according to claim 10, wherein the comparing comprises:
    performing at least one of a comparison of the adjusted in-phase signal with the global in-phase signal and a comparison of the adjusted quadrature-phase signal with global quadrature-phase signal to determine a first parameter indicative of a degree of correlation therebetween;
    performing at least one of a comparison of the adjusted in-phase signal with the global quadrature-phase signal and a comparison of the adjusted quadrature-phase signal with global in-phase signal to determine a second parameter indicative of a degree of correlation therebetween; and
    determining the error in the rotation angle as a function of the first and second parameters.

12. A method according to claim 11, wherein the error in the rotation angle is a suitable inverse trigonometric function of a combination of the first and second parameters.

13. A method according to claim 10, wherein the adjusted in-phase and quadrature-phase signals respectively correspond to first and second weighted sums of the in-phase and quadrature-phase signals.

14. A method according to claim 13, wherein the weights of the first and second weighted sums correspond to suitable trigonometric functions of the rotation angle.

15. A method according to claim 14, wherein the weights of the in-phase and quadrature-phase signals in the first weighted sum respectively correspond to the cosine of the rotation angle and the sine of the rotation angle, and the weights of the in-phase and quadrature-phase signals in the second weighted sum respectively correspond to minus one multiplied by the sine of the rotation angle and the cosine of the rotation angle.

16. A method according to claim 10, wherein the adding comprises selectively adding the adjusted in-phase and quadrature-phase signals to the global in-phase and quadrature-phase signals.

17. A method according to claim 10, comprising determining an initial value of the rotation angle for each of the plurality of radio frequency signals based upon information about a position of a transmission source.

\* \* \* \* \*